United States Patent
Lim et al.

(10) Patent No.: US 10,305,152 B2
(45) Date of Patent: May 28, 2019

(54) WATER COOLING SYSTEM FOR A BATTERY

(71) Applicants: HYUNDAI MOTOR COMPANY, Seoul (KR); KIA MOTORS CORPORATION, Seoul (KR)

(72) Inventors: Hae Kyu Lim, Bucheon-si (KR); Yong Hwan Choi, Yongin-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 222 days.

(21) Appl. No.: 15/371,822

(22) Filed: Dec. 7, 2016

(65) Prior Publication Data

US 2018/0090800 A1    Mar. 29, 2018

(30) Foreign Application Priority Data

Sep. 26, 2016   (KR) .................. 10-2016-0123036

(51) Int. Cl.
| | |
|---|---|
| *H01M 10/6555* | (2014.01) |
| *H01M 10/613* | (2014.01) |
| *H01M 10/6557* | (2014.01) |
| *H01M 10/6567* | (2014.01) |
| *H01M 10/625* | (2014.01) |

(52) U.S. Cl.
CPC ..... *H01M 10/6555* (2015.04); *H01M 10/613* (2015.04); *H01M 10/6557* (2015.04); *H01M 10/6567* (2015.04); *H01M 10/625* (2015.04)

(58) Field of Classification Search
CPC ........... H01M 10/6568; H01M 10/613; H01M 10/625; H01M 10/6555
See application file for complete search history.

(56) References Cited

U.S. PATENT DOCUMENTS

| | | | | |
|---|---|---|---|---|
| 2011/0189527 A1* | 8/2011 | Michelitsch | ........ | H01M 2/1077 429/120 |
| 2011/0244299 A1 | 10/2011 | Guener et al. | | |
| 2014/0099527 A1* | 4/2014 | Seong | ................ | H01M 2/1077 429/120 |

FOREIGN PATENT DOCUMENTS

| | | |
|---|---|---|
| KR | 1020110100273 A | 9/2011 |
| KR | 1020120066340 A | 6/2012 |
| KR | 1020120074426 A | 7/2012 |
| KR | 1020130125341 A | 11/2013 |
| KR | 101359905 B1 | 2/2014 |
| KR | 1020160107583 A | 9/2016 |

OTHER PUBLICATIONS

Office Action; KR10-2016-0123036; 5 pages; dated Jul. 11, 2017.

* cited by examiner

*Primary Examiner* — Jimmy Vo

(74) *Attorney, Agent, or Firm* — Lempia Summerfield Katz LLC

(57) ABSTRACT

A water cooling system for a battery includes: a cartridge combining a pair of battery cells; a base heat transfer plate having a first side being in surface contact with a side of the cartridge; a projective heat transfer plate protruding on a surface where the base heat transfer plate and the cartridge are in contact with each other; and a cooling channel being in surface contact with a second side of the base heat transfer plate and having a hole through a center for cooling water to flow.

4 Claims, 5 Drawing Sheets

[Fig 1]
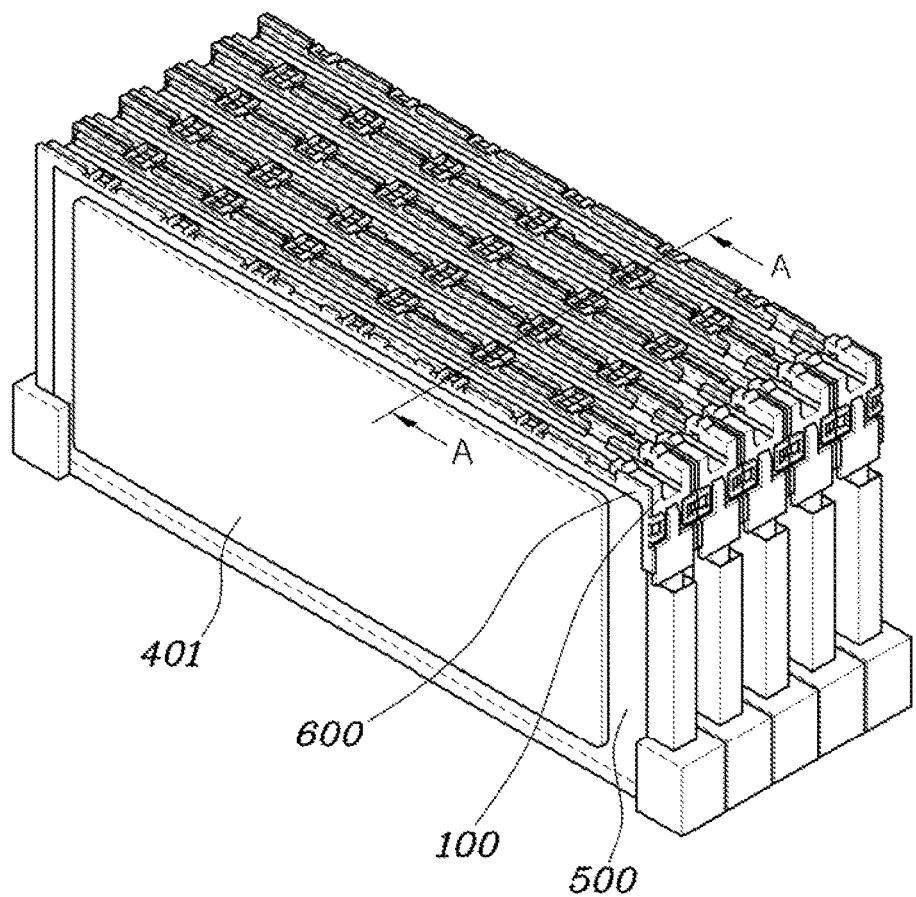

[Fig 2]
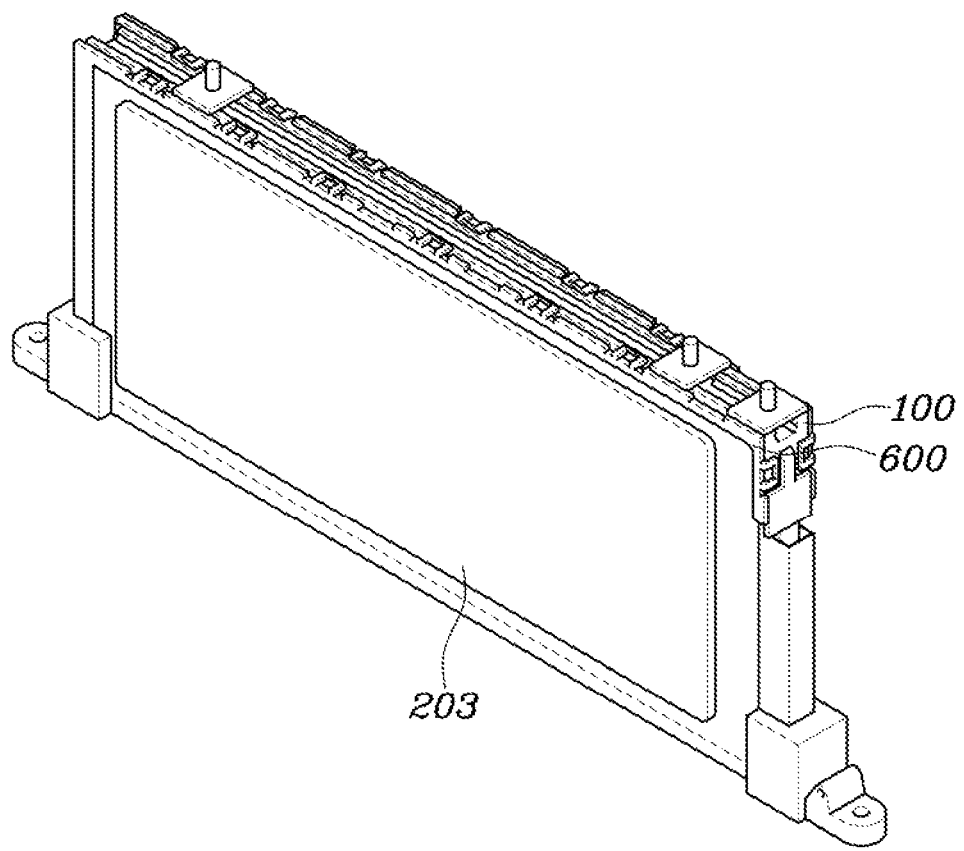

[Fig 3]
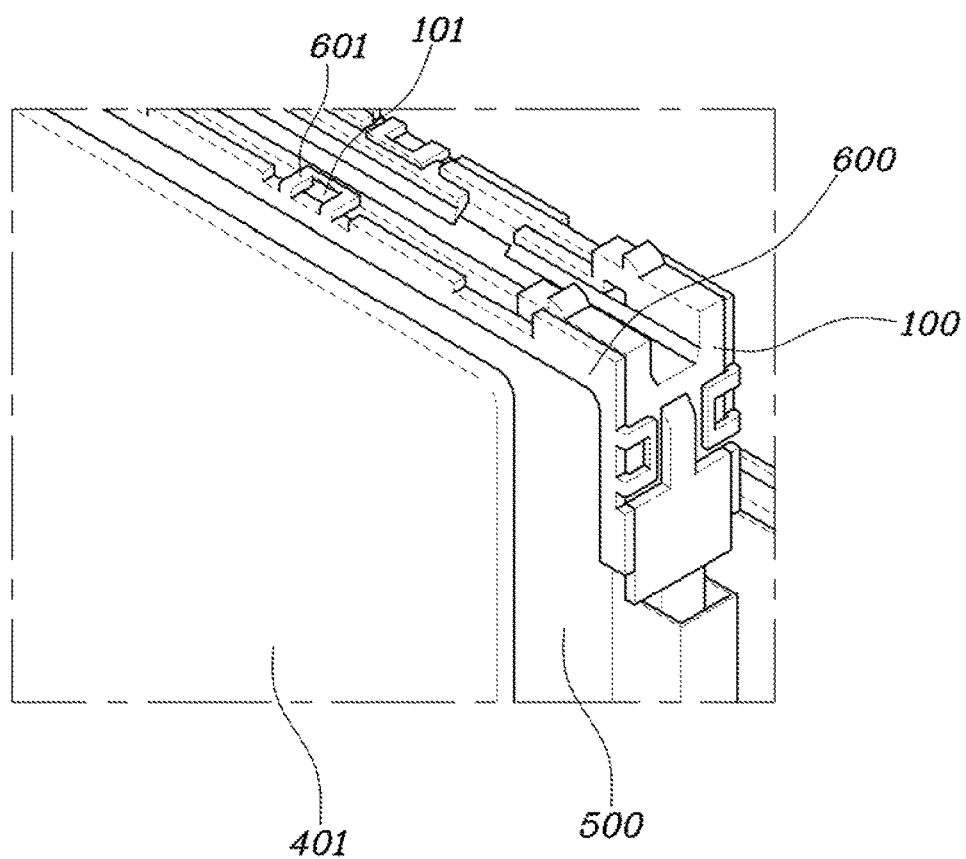

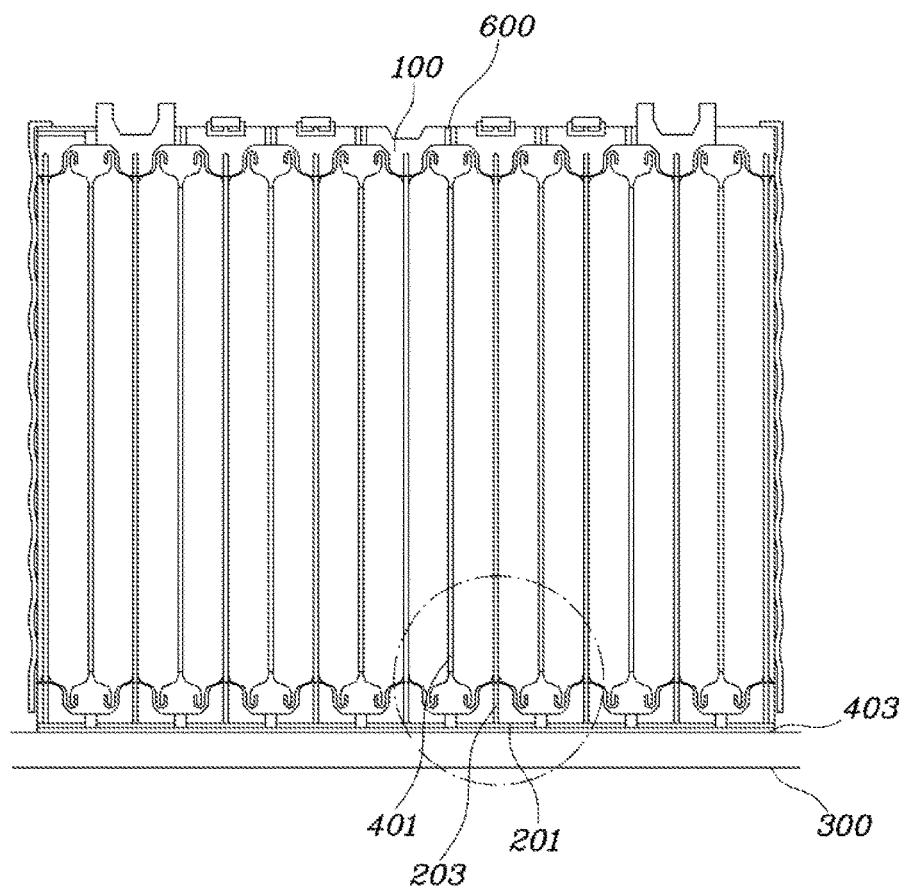

[Fig 5]
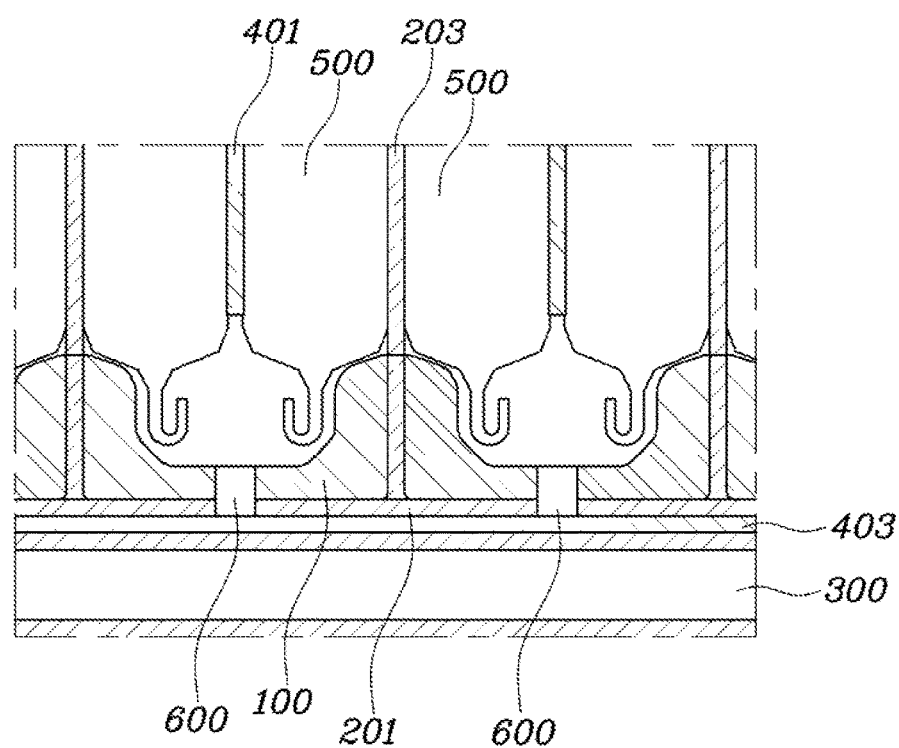

WATER COOLING SYSTEM FOR A BATTERY

CROSS REFERENCE TO RELATED APPLICATION

The present application claims priority to and the benefit of Korean Patent Application No. 10-2016-0123036, filed Sep. 26, 2016, the entire contents of which are incorporated herein for all purposes by this reference.

BACKGROUND

Field of the Disclosure

The present disclosure relates to a system for cooling a battery using cooling water. In particular, the present disclosure relates to a battery cell that can be commonly used for various types of vehicles and a structure for effective heat exchange between the battery cell and cooling channels.

Description of the Related Art

Environment-friendly vehicles, such as an electric vehicle and a hybrid vehicle, are equipped with a motor as a driving source for the vehicles. The energy source for the motor is electricity, so a battery installed in the vehicles. Generally, in most vehicles, the larger the capacity of the fuel tank, the further the vehicle can run, and similarly, for environment-friendly vehicles, the capacity of the battery proportional to the range of the vehicle, so the capacity of batteries is increasing.

However, as the capacity of batteries is increased, the batteries generated more heat. As a result, the performance of the batteries rapidly drops unless the heat is efficiently discharged. Thus, very important to maintain the operational temperature of the batteries at an appropriate level.

According to the air cooling type in the related art, battery cells are cooled by sending air through air channels between the battery cells. However, there is a limit in forming air channels for cooling battery cells. The numbers of battery cells are increasing due to the characteristics of the batteries that are mounted in limited spaces in vehicles and there is also a limit in efficiency.

In addition, similar to common vehicles, which have different engine displacements in accordance with the size or purpose of the vehicle and, correspondingly, have differences in fuel tank capacity, there are also differences in the capacities of the batteries of environment-friendly vehicles depending on the type thereof.

However, when batteries are separately designed for individual vehicle models, the cost of battery cell increases, and a problem also arises when it is required to change the specifications of batteries due to a change in the design of a vehicle. Further, even if there is a problem with only some of the battery cells in a battery, a problem occurs in that it is necessary to replace or repair the entire battery.

The description provided above is related art to the present disclosure and is provided for gaining an understanding of the background of the present disclosure and should not be construed as being included in the related art known by those skilled in the art.

SUMMARY

An object of the present disclosure is to provide a water cooling system that can efficiently cool a battery, in which unit cells, each composed of two batteries, are stacked, in a small space.

In order to achieve the objects of the present disclosure, a water cooling system for a battery according to an aspect of the present disclosure includes: a cartridge covering a plate-shaped battery cell and bringing a pair of battery cells in surface contact with each other; a base heat transfer plate having a first side being in surface contact with a side of the cartridge; a projective heat transfer plate protruding on a surface where the base heat transfer plate is in contact with the cartridge, and disposed between the pair of battery cells being in surface contact with each other through the cartridge; a cooling channel being in surface contact with second sides of the base heat transfer plate and having a hole through a center to pass cooling water; a compressive pad having a first side being in contact with an exposed side of one of the pair of battery cells; a plurality of each of the cartridge, the base heat transfer plate, the projective heat transfer plate, and the compressive pad; and spacers filling in spaces between stacked cartridges.

The system may further include a thermal interface material disposed between the plurality of base heat transfer plates and the cooling channel.

An exposed side of another battery cell may be in surface contact with a second side of the compressive pad, and the cooling channel may extend in a stacking direction of the battery cells.

A projection may be formed on the cartridge and a locking portion may be formed on the spacer. The spacer may be detachably coupled to the cartridge by coupling the projection and the locking portion.

According to the water cooling system for a battery of the present disclosure, even if the battery cells are arranged in a small space, it is possible to effectively perform cooling by using cooling water having a high heat capacity. It is also possible to easily change the battery for various vehicles for standardizing and sharing the battery.

BRIEF DESCRIPTION OF THE DRAWINGS

The above and other objects, features and other advantages of the present disclosure will be more clearly understood from the following detailed description when taken in conjunction with the accompanying drawings, in which:

FIG. 1 is a perspective view of a water cooling stem for a battery according to an embodiment of the present disclosure;

FIG. 2 is a view showing a cartridge, a projective heat transfer plate, and a spacer in the water cooling system for a battery according to an embodiment of the present disclosure;

FIG. 3 is a view showing in detail a coupling portion between the cartridge and the space in the water cooling system for a battery according to an embodiment of the present disclosure;

FIG. 4 a cross-sectional view taken along line A-A of FIG. 1; and

FIG. 5 is a partial enlarged view of the portion indicated the dashed dotted line in FIG. 4.

DETAILED DESCRIPTION OF THE DISCLOSURE

Hereinafter, embodiments of the present disclosure are described in detail with reference to the accompanying drawings.

FIG. 1 is a perspective view of a water cooling system for a battery according to an embodiment of the present disclosure. FIG. 2 is a view showing a cartridge 100, a projective heat transfer plate 203, and a spacer 600 in the water cooling system for a battery according to an embodiment of the present disclosure. FIG. 3 is a view showing in detail a coupling portions between the cartridge 100 and the space 600 in the water cooling system for a battery according to an embodiment of the present disclosure. FIG. 4 is a cross-sectional view taken along line A-A of FIG. 1 and FIG. 5 is a partial enlarged view of the portion indicated by the dashed dotted line in FIG. 4.

A water cooling system for a battery according to the present disclosure includes a cartridge 100 covering a plate-shaped battery cell 500 and bringing a pair of battery cells 500 in surface contact with each other. The water cooling system also includes a base heat transfer plate 201 having a first side being in surface contact with a side of the cartridge 100. The water cooling system also includes a projective heat transfer plate 203 protruding on the surface where the base heat transfer plate 201 is in contact with the cartridge 100, and disposed between a pair of battery cells 500 being in surface contact with each other through the cartridge 100. The water cooling system also includes a cooling channel 300 being in surface contact with second side of the base heat transfer plate 201 and having a hole through the center to pass cooling water. The system may further include compressive pads 401 having a first side being in contact with an exposed side of one of a pair of battery cells 500.

As shown in FIGS. 1-3, the configuration including a cartridge covering a pair of battery cells 500, a base heat transfer plate 201, a projective heat transfer plate 203, and a compressive pad 401 is one unit battery of a battery for a vehicle. Further, the base heat transfer plate 201 and the projective heat transfer plate 203 may be made of a metal having a high thermal conductivity, such as for example, aluminum.

A complete battery to be mounted on a vehicle is achieved by stacking the unit batteries having the configuration described above. However, the unit batteries are stacked in a small space, so discharge of heat is very important.

According to the present disclosure, referring to FIGS. 4 and 5, the base heat transfer plate 201 is in surface contact with a side of the cartridge 100, whereby the two components are thermally combined. The cooling channel 300 is in direct contact with a portion of the base heat transfer plate 201, whereby those two components are also thermally combined. When the cartridge 100 is made of plastic, discharge of heat from the battery cell 500 through the thermal combination of the cartridge 100 and the base plate may not be effective.

However, the projective heat transfer plate 203 is disposed between a pair of the battery cells 500 and is in direct contact with the battery cells 500 over a large area and is made of metal having a high thermal conductivity. Thus, the battery cell 500 and the cooling channel 300 are thermally combined through the projective heat transfer plate 203.

The system may further include a thermal interface material 403 disposed between the base heat transfer plate 201 and the cooling channel 300.

Referring to FIG. 5, as the thermal interface material (TIM) 403 is disposed between the cooling channel 300 and the base heat transfer plate 201, an air isolation layer, which may be formed between the cooling channel 300 and the base heat transfer platy 201 is removed, so the efficiency of thermal conduction can be increased.

In one embodiment, the base heat transfer plate 201 and the cooling channel 300 may be in complete surface contact with each other. However, an air layer is formed between the base heat transfer plate 201 and the cooling channel 300 due to limits the manufacturing process.

Aluminum, which exemplifies the base heat transfer plate 201 in the present disclosure, has a thermal conductivity of about 240 W/m·K, but the thermal conductivity of air is only 0.025 W/m·K. Accordingly, this air layer substantially acts as an isolation layer.

The thermal interface material 403 may be obtained various ways. As for thermal conductive grease, which is the most basic example, the thermal conductivity is 4 W/m·K, which is very low compared with that of aluminum, but higher than air, so it can increase the efficiency of thermal conduction.

The cartridge 100, base heat transfer plate 201, projective heat transfer plate 203, and compressive pad 401 are each a plurality of pieces. The exposed side of another battery cell 500 is in surface contact with a second side of the compressive pad 401. The cooling channel 300 may extend in the stacking direction of the battery cells 500.

As described above, the cartridge 100, base heat transfer plate 201, projective heat transfer plate 203, and compressive pad 401 form a unit battery of the battery. Thus, it is possible to satisfy the battery capacities required by various vehicles by easily changing the number of the unit batteries that are stacked even if the vehicles require different battery capacities.

The unit batteries are stacked as follows. Referring to FIGS. 1-4, a first side of the compressive pad 401 is in contact with the exposed side of a first battery cell 500 of a pair of battery cells 500. The exposed side of a second battery cell 500 of another pair of battery cells 500 is in surface contact with the second side of the compressive pad 401, whereby the battery cells are stacked in this way. Accordingly, the concentration of the battery cells 500 is increased even without forming an air channel between every pair of battery cells 500. Thus, the space occupied by the battery cell is reduced.

Although spaces for air to flow for removing the battery cells 500 are removed, cooling water having higher heat capacity than air is used for discharging heat. Thus, it is possible to sufficiently discharge the heat that is generated while the battery is operated.

The system may further include spacers 600 filling in the spaces between the stacked cartridges 100. A projection 101 formed on each cartridge 100 and a locking portion 601 is formed on each spacer 600. Each spacer 600 can be detachably coupled to a corresponding cartridge 100 by coupling the projection 101 and the locking portion 601.

The capacity of the battery can be adjusted by changing the number of battery cells 500 to be stacked. However, it may be possible to increase the capacity of the battery by increasing the capacities of the battery cells 500. In one embodiment, it is possible to increase the capacities of the battery cells 500 by increasing the thickness without changing the width of the battery cells 500. However, if the battery cells 500 are made thicker than the cartridge 100, the battery cells 500 may be damaged by the excessive load applied to them.

Accordingly, in the present disclosure, as shown in FIGS. 1-3, the spacers 600 are provided so that the spaces between the cartridges 100 that are stacked can be adjusted in accordance with the type of the battery cells 500 to be mounted on the cartridges 100. Accordingly, the water cooling system for a battery can be shared by various battery cells 500.

Further, the spacer 600 can be easily and detachably coupled to the cartridge 100 by the projection 101 of the cartridge 100 and the locking portion 601 of the spacer 600. Accordingly, it is possible to quickly configure a water cooling system for a battery in accordance with the size of the battery cells 500.

Although the present disclosure has been described with reference to specific embodiments shown in the drawings, it will be apparent to those having ordinary skill in the art that the present disclosure may be changed and modified in various ways without departing from the scope of the present disclosure, which is described in the following claims.

What is claimed is:

1. A water cooling system for a battery, the system comprising:
   a cartridge covering a plate-shaped battery cell and bringing a pair of battery cells in surface contact with each other;
   a base heat transfer plate having a first side being in surface contact with a side of the cartridge;
   a projective heat transfer plate protruding on a surface where the base heat transfer plate is in contact with the cartridge, and disposed between the pair of battery cells being in surface contact with each other through the cartridge;
   a cooling channel being in surface contact with a second side of the base heat transfer plate and having a hole through a center to pass cooling water;
   a compressive pad having a first side being in contact with an exposed side of one of the pair of battery cells;
   a plurality of each of the cartridge, the base heat transfer plate, the projective heat transfer plate, and the compressive pad; and
   spacers filling in spaces between stacked cartridges.

2. The system of claim 1, further comprising a thermal interface material disposed between the plurality of base heat transfer plates and the cooling channel.

3. The system of claim 1, wherein an exposed side of another battery cell is in surface contact with a second side of the compressive pad, and wherein the cooling channel extends in a stacking direction of the battery cells.

4. The system of claim 1, wherein a projection is formed on each cartridge and a locking portion is formed on each spacer, so that each spacer is detachably coupled to the respective cartridge by coupling the projection and the locking portion.

* * * * *